United States Patent
Ikeda et al.

(10) Patent No.: US 9,758,028 B2
(45) Date of Patent: Sep. 12, 2017

(54) VEHICLE PANEL STRUCTURE

(71) Applicant: TOYOTA JIDOSHA KABUSHIKI KAISHA, Toyota-shi, Aichi-ken (JP)

(72) Inventors: Koki Ikeda, Toyota (JP); Kiyoshi Hokazono, Toyota (JP); Tomohiro Sakurai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/039,195

(22) PCT Filed: Dec. 16, 2014

(86) PCT No.: PCT/JP2014/083305
§ 371 (c)(1),
(2) Date: May 25, 2016

(87) PCT Pub. No.: WO2015/098628
PCT Pub. Date: Jul. 2, 2015

(65) Prior Publication Data
US 2017/0036524 A1    Feb. 9, 2017

(30) Foreign Application Priority Data
Dec. 25, 2013 (JP) .................................. 2013-267968

(51) Int. Cl.
*B60K 1/04* (2006.01)
*B62D 25/20* (2006.01)
*B62D 29/04* (2006.01)

(52) U.S. Cl.
CPC ................ *B60K 1/04* (2013.01); *B62D 25/20* (2013.01); *B62D 29/043* (2013.01); *B60K 2001/0438* (2013.01); *B60Y 2304/03* (2013.01); *B60Y 2306/01* (2013.01)

(58) Field of Classification Search
CPC .. B60Y 2304/03; B60Y 2306/01; B60K 1/04; B60K 2001/0438; B62D 25/20; B62D 29/043
USPC ......................................................... 180/68.5
See application file for complete search history.

(56) References Cited

U.S. PATENT DOCUMENTS

| | | | | |
|---|---|---|---|---|
| 3,167,458 A | * | 1/1965 | Brazell | H01M 2/1072 180/68.5 |
| 5,156,225 A | * | 10/1992 | Murrin | H01M 2/1083 180/60 |
| 5,639,571 A | * | 6/1997 | Waters | B60L 11/1874 180/68.5 |

(Continued)

FOREIGN PATENT DOCUMENTS

| | | |
|---|---|---|
| JP | H10-6785 A | 1/1998 |
| JP | 2006-182295 A | 7/2006 |

(Continued)

*Primary Examiner* — J. Allen Shriver, II
*Assistant Examiner* — Brian Cassidy
(74) *Attorney, Agent, or Firm* — Oliff PLC

(57) ABSTRACT

A vehicle panel structure that includes a first panel that is provided to a vehicle, the first panel being made from a fiber reinforced resin and including a plurality of first beads extending along one direction, and a second panel that is disposed so as to face the first panel and that includes a plurality of second beads extending along another direction intersecting with the first beads.

6 Claims, 6 Drawing Sheets

(56) References Cited

U.S. PATENT DOCUMENTS

| | | | | |
|---|---|---|---|---|
| 5,833,023 | A * | 11/1998 | Shimizu | B62D 21/00 180/68.5 |
| 6,040,080 | A * | 3/2000 | Minami | B60K 1/04 429/100 |
| 6,085,854 | A * | 7/2000 | Nishikawa | B60K 1/04 180/68.5 |
| 6,189,635 | B1 * | 2/2001 | Schuler | B60R 16/04 180/65.1 |
| 6,619,724 | B2 * | 9/2003 | Blomeling | B60J 5/042 296/146.5 |
| 7,281,754 | B2 * | 10/2007 | Behr | B29C 70/342 264/258 |
| 8,557,436 | B2 * | 10/2013 | Schwab | B60K 1/04 429/163 |
| 8,776,927 | B2 * | 7/2014 | Akazawa | H01M 2/1077 180/65.1 |
| 8,936,299 | B2 * | 1/2015 | Tanaka | B62D 25/20 296/187.09 |
| 8,939,246 | B2 * | 1/2015 | Yamaguchi | B60K 1/04 180/311 |
| 9,281,505 | B2 * | 3/2016 | Hihara | B60K 1/04 |
| 9,315,213 | B2 * | 4/2016 | Raymond | B62D 25/02 |
| 9,321,338 | B2 * | 4/2016 | Naruke | B62D 25/20 |
| 9,352,787 | B2 * | 5/2016 | Hihara | B62D 25/20 |
| 9,440,523 | B2 * | 9/2016 | Decker | H01M 2/0237 |
| 2007/0132278 | A1 * | 6/2007 | Lester | B62D 29/043 296/191 |
| 2009/0325049 | A1 | 12/2009 | Niedzwiecki et al. | |
| 2010/0025137 | A1 * | 2/2010 | Mughal | B62J 7/04 180/68.5 |
| 2010/0207426 | A1 * | 8/2010 | Tsuruta | B62D 21/157 296/187.12 |
| 2012/0103714 | A1 * | 5/2012 | Choi | B60K 1/04 180/68.5 |
| 2012/0125703 | A1 * | 5/2012 | Arns | B60K 1/04 180/68.5 |
| 2012/0223113 | A1 * | 9/2012 | Gaisne | H01M 2/1083 224/538 |
| 2012/0318452 | A1 * | 12/2012 | Bradley | B29C 44/1271 156/258 |
| 2014/0205809 | A1 * | 7/2014 | Ishii | B32B 3/30 428/161 |
| 2015/0147536 | A1 * | 5/2015 | Lungershausen | B62D 29/043 428/189 |
| 2015/0158532 | A1 * | 6/2015 | Ayuzawa | B62D 25/2009 296/193.07 |
| 2015/0174996 | A1 * | 6/2015 | Ikeda | B60K 1/04 180/68.5 |
| 2015/0175210 | A1 * | 6/2015 | Raymond | B62D 21/10 296/191 |
| 2015/0180078 | A1 * | 6/2015 | Ikeda | B60L 11/1898 180/68.5 |
| 2015/0249240 | A1 * | 9/2015 | Hihara | B60K 1/04 180/68.5 |
| 2015/0336452 | A1 * | 11/2015 | Decker | H01M 2/0237 180/68.5 |
| 2016/0001721 | A1 * | 1/2016 | Owens | B60R 19/023 296/187.03 |
| 2016/0114667 | A1 * | 4/2016 | Ikeda | B60K 1/04 180/68.5 |
| 2016/0114699 | A1 * | 4/2016 | Hokazono | B60L 11/1877 180/68.5 |
| 2016/0200014 | A1 * | 7/2016 | Patberg | B29C 70/46 264/442 |
| 2016/0207572 | A1 * | 7/2016 | Natsume | B62D 25/20 |
| 2016/0250915 | A1 * | 9/2016 | Kobukata | B60K 1/04 180/68.5 |
| 2016/0288636 | A1 * | 10/2016 | Kamimura | B60K 8/00 |
| 2016/0288737 | A1 * | 10/2016 | Kamimura | H01M 2/1077 |
| 2016/0311301 | A1 * | 10/2016 | Ikeda | B62D 29/001 |
| 2016/0318556 | A1 * | 11/2016 | Ikeda | B60K 1/04 |
| 2016/0375750 | A1 * | 12/2016 | Hokazono | B60K 1/04 180/68.5 |
| 2017/0001507 | A1 * | 1/2017 | Ashraf | B60K 1/04 |

FOREIGN PATENT DOCUMENTS

| | | |
|---|---|---|
| JP | 2007-045319 A | 2/2007 |
| JP | 2009-061955 A | 3/2009 |
| JP | 2011-526728 A | 10/2011 |
| JP | 2012-126058 A | 7/2012 |
| JP | 2013-032065 A | 2/2013 |
| JP | 2013-060060 A | 4/2013 |
| JP | 2013-136275 A | 7/2013 |

* cited by examiner

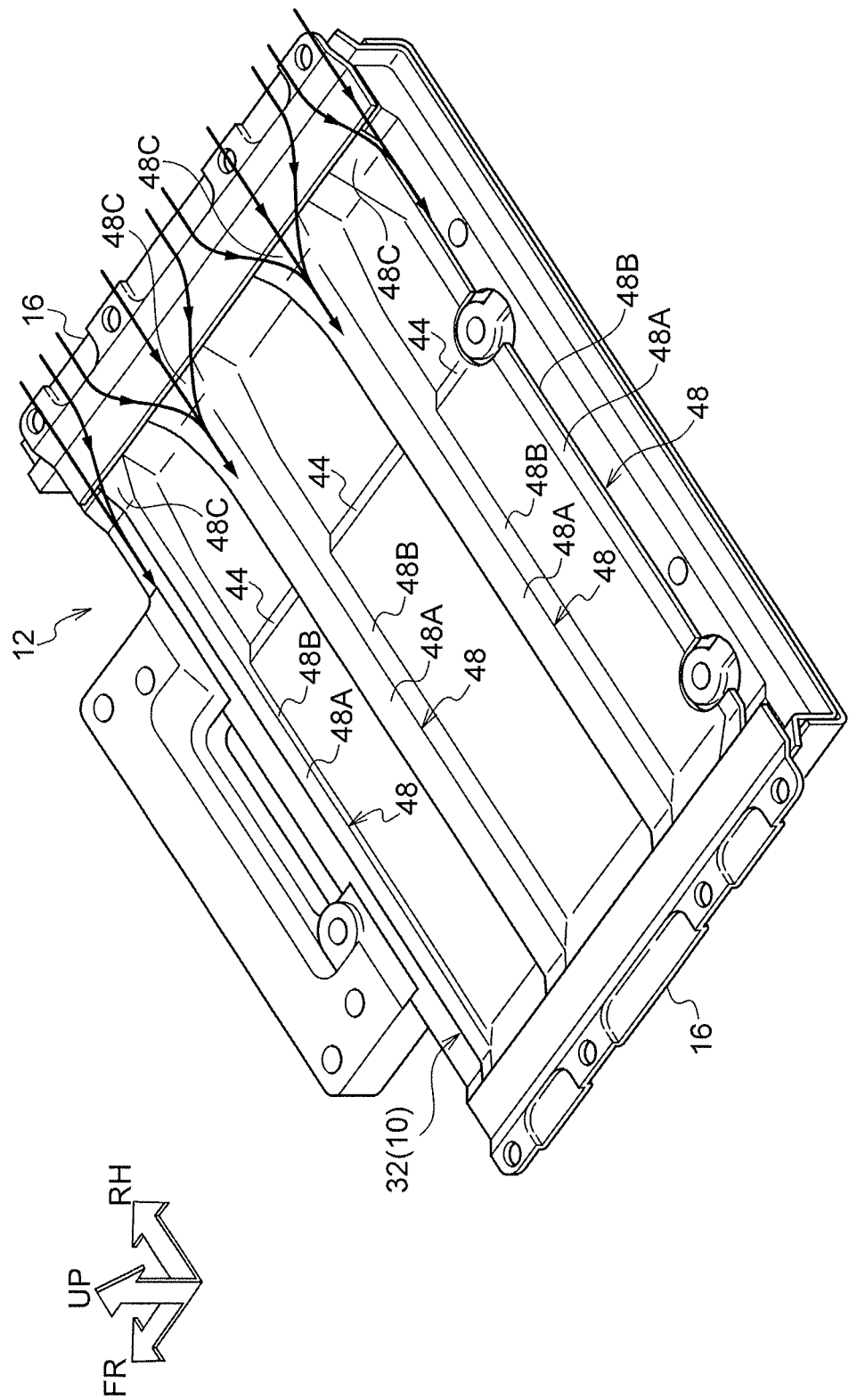

VEHICLE PANEL STRUCTURE

TECHNICAL FIELD

The present invention relates to a vehicle panel structure.

BACKGROUND ART

As a vehicle panel structure provided to a vehicle, Japanese Patent Application Laid-Open (JP-A) No. 2013-136275 describes a cabin that is applied with a vehicle panel structure made from carbon fiber reinforced plastic (CFRP) and provided with a corrugated core member between a flat plate shape cabin lower shell section and a flat plate shape cabin upper shell section.

SUMMARY OF INVENTION

Technical Problem

However, in the above vehicle panel structure, sometimes load is not favorably transmitted when load acts in a direction orthogonal to the axial direction of the core member. Thus there is room for improvement from the perspective of raising rigidity.

In consideration of the above circumstances, an object of the present invention is to provide a vehicle panel structure capable of raising the rigidity to load from plural directions.

Solution to Problem

A vehicle panel structure according to a first aspect of the present invention includes a first panel that is provided to a vehicle, the first panel being made from a fiber reinforced resin and including plural first beads present extending along one direction, and a second panel that is disposed so as to face toward the first panel and that includes plural second beads present extending along an other direction intersecting with the first beads.

In the vehicle panel structure according to the first aspect of the present invention, the first panel provided to the vehicle includes the plural first beads, and the first beads are present extending along the one direction. Moreover, the second panel disposed facing the first panel includes the plural second beads. These second beads are present extending in the other direction intersecting with the first beads. This thereby enables load to be favorably transmitted along the first beads of the first panel when, for example, load acts on the vehicle panel structure from the one direction. Moreover, load can be favorably transmitted along the second beads of the second panel when load acts on the vehicle panel structure from the other direction intersecting with the one direction. Thus, in this manner, the rigidity to load from plural directions can be raised. Note that the beads referred to here indicate locations formed in a rib shape by press molding or the like. Moreover, forming the first panel from a fiber reinforced resin enables a reduction in weight to be achieved compared to cases in which the first panel is formed from metal, while still securing rigidity.

The vehicle panel structure according to a second aspect of the present invention is the vehicle panel structure of the first aspect, wherein the second panel is a bottom wall configuring a bottom face of a battery case provided under a vehicle and housing a battery, and the first panel is an upper panel that supports the battery case.

In the vehicle panel structure according to the second aspect of the present invention, the battery case is provided under a vehicle, and so space at the vehicle interior can be secured. Moreover, raising the rigidity of the vehicle panel structure using the first beads and the second beads enables the battery case to be protected, even in cases in which, for example, a projecting object on the road surface has impinged on the upper panel.

A vehicle panel structure according to a third aspect of the present invention is the vehicle panel structure of the second aspect, wherein the first beads are present extending along a vehicle width direction, and at end portions of the first beads in the vehicle width direction, a width of the first beads widens on progression toward a leading end.

In the vehicle panel structure according to the third aspect of the present invention, the end portions of the first beads in the vehicle width direction are widened, and so this thereby enables collision load input to the vehicle panel structure during a vehicle side-on collision to be efficiently transmitted to the first beads. This thereby enables the collision load acting on the battery case to be reduced. Moreover, warping after molding can be reduced even in cases in which the first panel is molded using a mold.

A vehicle panel structure according to a fourth aspect of the present invention is the vehicle panel structure of the second aspect or the third aspect, wherein a core panel is provided below the upper panel. The core panel includes plural third beads that are present extending along one direction. The third beads and the first beads are disposed superimposed above and below each other, and a sloping face sloping toward a vehicle front-rear direction from a top face of the respective first bead, slopes more gently than a sloping face sloping toward the vehicle front-rear direction from a top face of the respective third bead.

In the vehicle panel structure according to the fourth aspect of the present invention, the sloping face of the first bead slopes more gently than the sloping face of the respective third bead. This thereby enables a gap to be formed between the sloping face of the first bead and the sloping face of the third bead, enabling the closed cross-section area to be increased. This thereby enables the rigidity of the vehicle panel structure to be raised, and enables warping after forming to be reduced.

Advantageous Effects of Invention

As described above, the vehicle panel structure according to the present invention has the excellent advantageous effect of enabling the rigidity to loads from plural directions to be raised.

BRIEF DESCRIPTION OF DRAWINGS

FIG. 6 is a perspective view illustrating transmission paths of collision load when collision load acts on a stack frame according to an exemplary embodiment.

DESCRIPTION OF EMBODIMENTS

Detailed explanation follows regarding a vehicle panel structure according to an exemplary embodiment of the present invention, with reference to the drawings. Note that in the following explanation, as an example, an exemplary embodiment is described in which a vehicle panel structure of the present invention is applied to a fuel cell stack 70 disposed at the lower side of a floor panel of a vehicle, and to a stack frame 12 that supports the fuel cell stack 70. However, there is no limitation thereto, and the vehicle panel structure may be applied to frames and the like employed in other applications. For example, employment may be made in a frame that supports a secondary battery. For ease of explanation, in each of the drawings, the arrow UP indicates a vehicle upward direction, the arrow FR indicates a vehicle front direction, and arrow RH indicates a vehicle right direction. Moreover, in cases in which reference is simply made to up or down, front or rear, or left or right directions, these indicate up or down in the vehicle up-down direction, front or rear in the vehicle front-rear direction, and left or right in the vehicle left-right direction (the vehicle width direction).

Stack Frame Configuration

Figure 1:
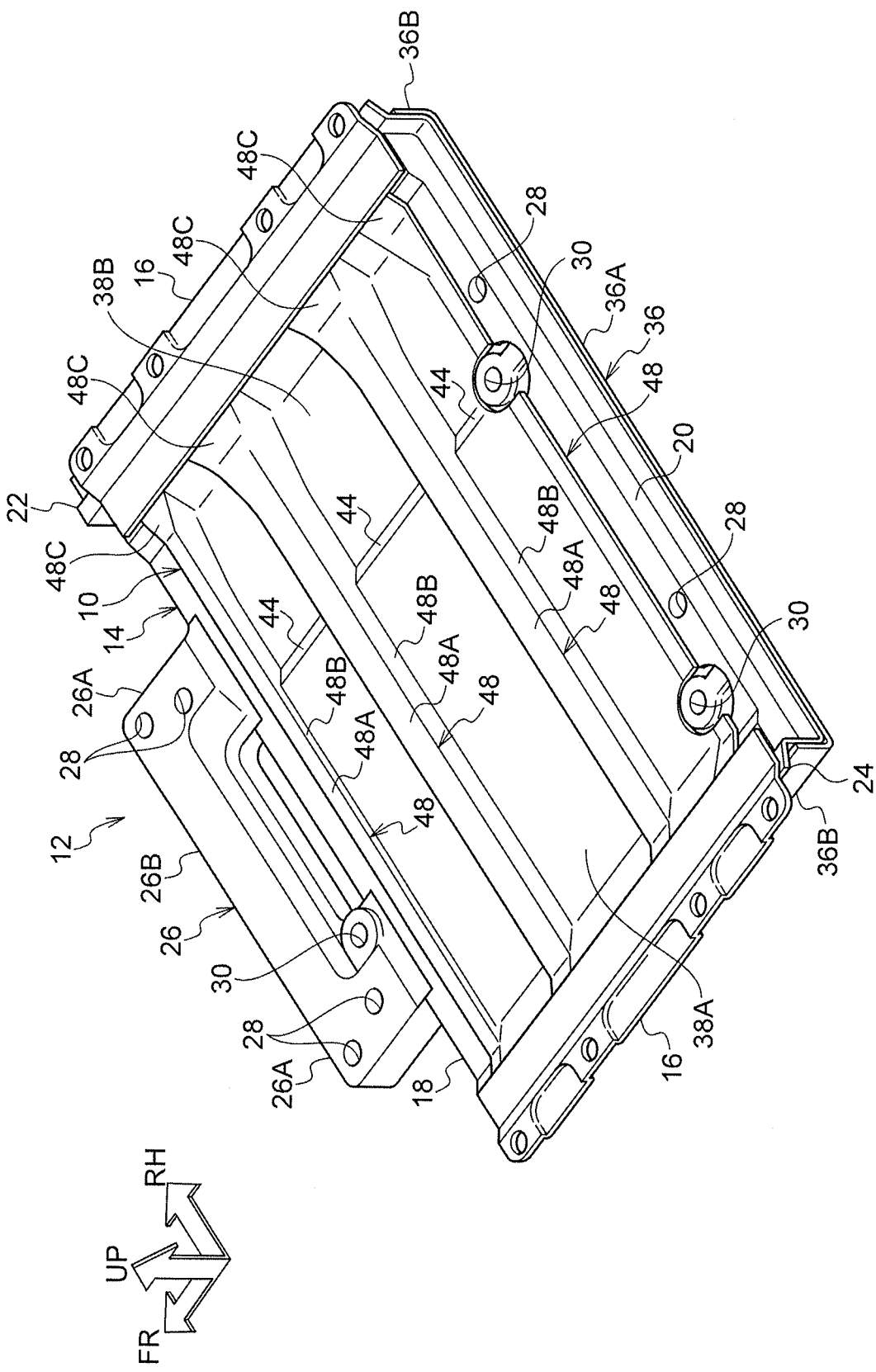
FIG. 1 is a plan view illustrating a stack frame according to an exemplary embodiment.

As illustrated in FIG. 1, a resin panel unit 10 configuring part of a vehicle panel structure of the present exemplary embodiment is employed as part of the stack frame 12. The stack frame 12 is a frame that is disposed at the lower side of a floor panel of a vehicle, such as an electric vehicle, and that supports the fuel cell stack 70, described later, from the vehicle lower side. The stack frame 12 is configured principally including a frame shaped frame body 14, a pair of left and right upper ductile members 16, and the resin panel unit 10.

The frame body 14 is formed in a rectangular frame shape, and includes a front side long edge section 18 and a rear side long edge section 20 that are each present extending along the vehicle width direction, and a right side short edge section 22 and a left side short edge section 24 that are each present extending along the vehicle front-rear direction and that couple both vehicle width direction end portions of the front side long edge section 18 and the rear side long edge section 20 together. The frame body 14 is a metal member, and, as an example in the present exemplary embodiment, is formed from steel.

The front side long edge section 18 configuring the frame body 14 is formed with a substantially hat shaped cross-section, protruding upward, and a fastening piece 26 is provided to the front side long edge section 18 at a central portion in the vehicle width direction. The fastening piece 26 includes a left and right pair of extension sections 26A extending out from the front side long edge section 18 toward the vehicle front, and a coupling section 26B present extending along the vehicle width direction and coupling the extension sections 26A together. The fastening piece 26 is thereby formed in a substantially flattened U-shape open toward the vehicle rear side in plan view. Two bolt holes 28 for fastening the frame body 14 to the vehicle body are formed in each of the pair of extension sections 26A. A bolt hole 30 for fastening the fuel cell stack 70, described later, is formed in an end portion of the extension section 26A on the vehicle left side.

The rear side long edge section 20 is disposed further to the vehicle rear side than the front side long edge section 18, and is present extending along the vehicle width direction parallel to the front side long edge section 18. The rear side long edge section 20 is formed with a substantially hat shaped cross-section, protruding upward. Bolt holes 30 for fastening the fuel cell stack 70 are respectively formed to a vehicle left end portion of the rear side long edge section 20, and to a location on the rear side long edge section 20 slightly further to the right side than a vehicle width direction central portion thereof. The locations where the bolt holes 30 are provided extend out further to the vehicle front side than the main part of the rear side long edge section 20, and the bolt holes 30 are formed to end portions on the vehicle front side of the rear side long edge section 20. Bolt holes 28 for fastening the frame body 14 to the vehicle body are respectively formed further to the vehicle right than the bolt holes 30.

Figure 2:
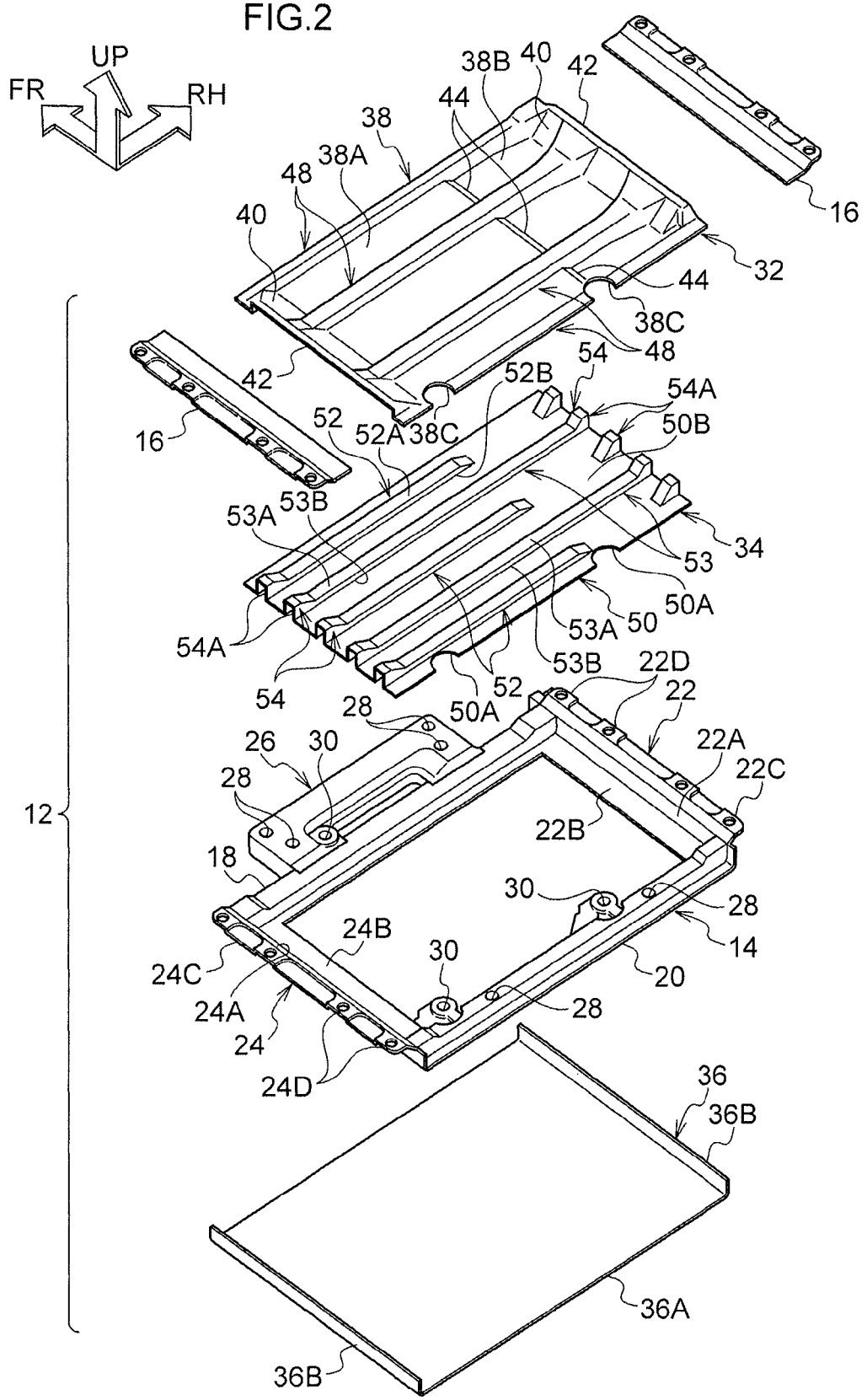
FIG. 2 is an exploded perspective view illustrating a stack frame according to an exemplary embodiment.

The vehicle left end portion of the front side long edge section 18 and the vehicle left end portion of the rear side long edge section 20 are coupled together by the left side short edge section 24. As illustrated in FIG. 2, the left side short edge section 24 includes a left side upright wall 24A present extending up and down, a left side jutting out portion 24B jutting out from a lower end portion of the left side upright wall 24A toward the vehicle width direction inside, and a left side flange portion 24C jutting out from an upper end portion of the left side upright wall 24A toward the vehicle width direction outside.

Plural left side protrusion beads 24D are provided, extending in the vehicle width direction, to the left side flange portion 24C. The left side protrusion beads 24D are formed so as to protrude upward, and, as an example in the present exemplary embodiment, there are four of the left side protrusion beads 24D provided along the vehicle front-rear direction with spacings between each other. Bolt holes for fastening the frame body 14 to the vehicle body are formed in the respective left side protrusion beads 24D.

The vehicle right end portion of the front side long edge section 18 and the vehicle right end portion of the rear side long edge section 20 are coupled together by the right side short edge section 22. The right side short edge section 22 includes a right side upright wall 22A present extending up and down, a right side jutting out portion 22B jutting out from a lower end portion of the right side upright wall 22A toward the vehicle width direction inside, and a right side flange portion 22C jutting out from an upper end portion of the right side upright wall 22A toward the vehicle width direction outside. Plural right side protrusion beads 22D are provided, extending in the vehicle width direction, to the right side flange portion 22C, and bolt holes for fastening the frame body 14 to the vehicle body are formed in the respective right side protrusion beads 22D.

As illustrated in FIG. 1, the resin panel unit 10 is attached to the frame body 14 configured as described above, and the upper ductile members 16 are joined, from above, to each of the two vehicle width direction end portions of the resin panel unit 10. The upper ductile members 16 are elongated shaped members made from metal and having their length directions along the vehicle front-rear direction. A lower face of each of the upper ductile members 16 is joined by adhesive to an upper face of an upper panel 32 of the resin panel unit 10.

Resin Panel Unit 10 Configuration

Next, explanation follows regarding the resin panel unit 10 configuring the stack frame 12. As illustrated in FIG. 2, the resin panel unit 10 is configured principally including an upper panel 32 serving as a first panel, a core panel 34, and a lower panel 36, these being stacked along the vehicle up-down direction.

The upper panel 32 is a member made from fiber reinforced plastic (FRP), and, as an example in the present exemplary embodiment, is molded in carbon fiber reinforced plastic (CFRP). There is, however, no limitation thereto, and the upper panel 32 may be formed from another fiber reinforced resin material such as, for example, glass fiber reinforced plastic (GFRP), or polyethylene fiber reinforced plastic (DFRP). The upper panel 32 may also be formed from a material other than resin, such as metal. Similar applies to the core panel 34 and the lower panel 36, described later.

The upper panel 32 includes a top section 38 of substantially rectangular shape in plan view, and sloping portions 40 are contiguously provided at the two vehicle width direction ends of the top section 38 sloping upward on progression toward the vehicle width direction outside so as to follow the shape of the two vehicle width direction end portions of the core panel 34, described later. A rectangular flat plate shaped flange portion 42 is contiguously provided to each of the two vehicle width direction end portions of the sloping portions 40 so as to extend out substantially horizontally toward the vehicle width direction outside. Furthermore, cutouts 38C are also formed to parts of a vehicle rear side end portion of the top section 38, so as to avoid impinging on the rear side long edge section 20 configuring the frame body 14.

Steps 44 are formed to the top section 38 just slightly further toward the right side than a central portion thereof in the vehicle width direction. The steps 44 are present extending along the vehicle front-rear direction, and the top section 38 is divided by the steps 44 into a left top portion 38A on the left side and a right top portion 38B on the right side. Due to the steps 44 sloping at an angle downwards on progression from the vehicle left toward the vehicle right, the left top portion 38A is positioned further upward than the right top portion 38B.

Plural protrusion beads 48 are formed as first beads along the vehicle width direction (one direction) to the top section 38. As an example in the present exemplary embodiment, there are four of the protrusion beads 48 formed. As illustrated in FIG. 1, the protrusion beads 48 are respectively formed projecting the top section 38 out so as to protrude toward the vehicle upward direction. Each of the protrusion beads 48 includes a top face 48A, present extending substantially horizontally in the vehicle width direction and spanning between the left top portion 38A and the right top portion 38B, and sloping faces 48B that respectively slope from the apex face 48A downward toward the vehicle front-rear direction. Two protrusion beads 48 that are provided in a vehicle front-rear direction central portion of the top section 38 are formed wider than the other two protrusion beads 48.

Widening portions 48C are provided to vehicle right end portions of the respective protrusion beads 48. The widening portions 48C are formed such that the width of the protrusion beads 48 gradually widens on progression toward the respective leading end. The widening portions 48C of the two protrusion beads 48 provided at the vehicle front-rear direction central portion are formed with a width of the protrusion beads 48 that widens toward the vehicle front and rear. The widening portions 48C of the other two protrusion beads 48 are formed so as to widen in width toward one side only.

As illustrated in FIG. 2, the carbon fiber reinforced plastic (CFRP) lower panel 36 is disposed lower than the upper panel 32. The lower panel 36 is positioned lower than the frame body 14, and includes a flat plate shaped bottom section 36A that is substantially rectangular in plan view, and a side wall sections 36B that are bent substantially perpendicularly around toward the vehicle upper side from the two respective vehicle width direction end portions of the bottom section 36A. The side wall sections 36B are respectively overlapped with the left side upright wall 24A and the right side upright wall 22A of the frame body 14, and joined by an adhesive or the like thereto. Note that a joining member other than adhesive may be employed, and, for example, joining may be accomplished by employing nuts and bolts. Moreover, joining may be accomplished by rivets or the like, or by a combination of the above. Similar applies to joining together of plural components in the following explanation, and various joining members may be employed, with no limitation to adhesive.

The core panel 34 made from carbon fiber reinforced plastic (CFRP) is disposed between the upper panel 32 and the lower panel 36. The core panel 34 is formed slightly smaller than the frame body 14, so as to fit inside the frame of the frame body 14. The core panel 34 includes a core body section 50 of substantially rectangular shape in plan view. Cutouts 50A are also formed to parts of a vehicle rear side end portion of the core body section 50, so as to avoid impinging on the rear side long edge section 20 configuring the frame body 14.

Protrusion beads 52 and protrusion beads 53 are also provided as third beads to the core body section 50, and are present respectively extending along the vehicle width direction with substantially hat shaped cross-sections. The protrusion beads 52 are disposed at three locations, the two vehicle front-rear direction end portions, and a vehicle front-rear direction central portion, of the core body section 50. The protrusion beads 52 are formed including apex portions 52A present extending substantially horizontally along the vehicle width direction, and sloping faces 52B that slope downward from the apex portions 52A toward the vehicle front and rear directions. The protrusion beads 52 terminate at positions slightly to the right side of a vehicle width direction central portion inside the core body section 50. The shape of the terminal ends is sloped so as to correspond to the shape of the steps 44 formed to the top section 38 of the upper panel 32.

The protrusion beads 53 are provided between adjacent protrusion beads 52, and are each present extending from one end portion toward the other end portion of the core body section 50 in the vehicle width direction. Similarly to the protrusion beads 52, the protrusion beads 53 are formed including apex portions 53A and sloping faces 53B. Regions between the protrusion beads 53, and further toward the vehicle right than terminal ends portions where the protrusion beads 52 end, configure a flat face portion 50B formed in a substantially planar shape.

Projection portions 54 are formed to the two vehicle width direction end portions of the core body section 50 so as to project out toward the vehicle upper side. The projection portions 54 each slope in an upward slope toward the vehicle width direction outside, and are then also extend substantially horizontally toward the vehicle width direction outside. End portions at the vehicle width direction outside of the projection portions 54 configure end face portions 54A, which configure cut faces substantially perpendicular to the core body section 50. Namely, the projection portions 54 are formed in substantially trapezoidal shapes when viewed face-on along from the vehicle rear.

Figure 4:
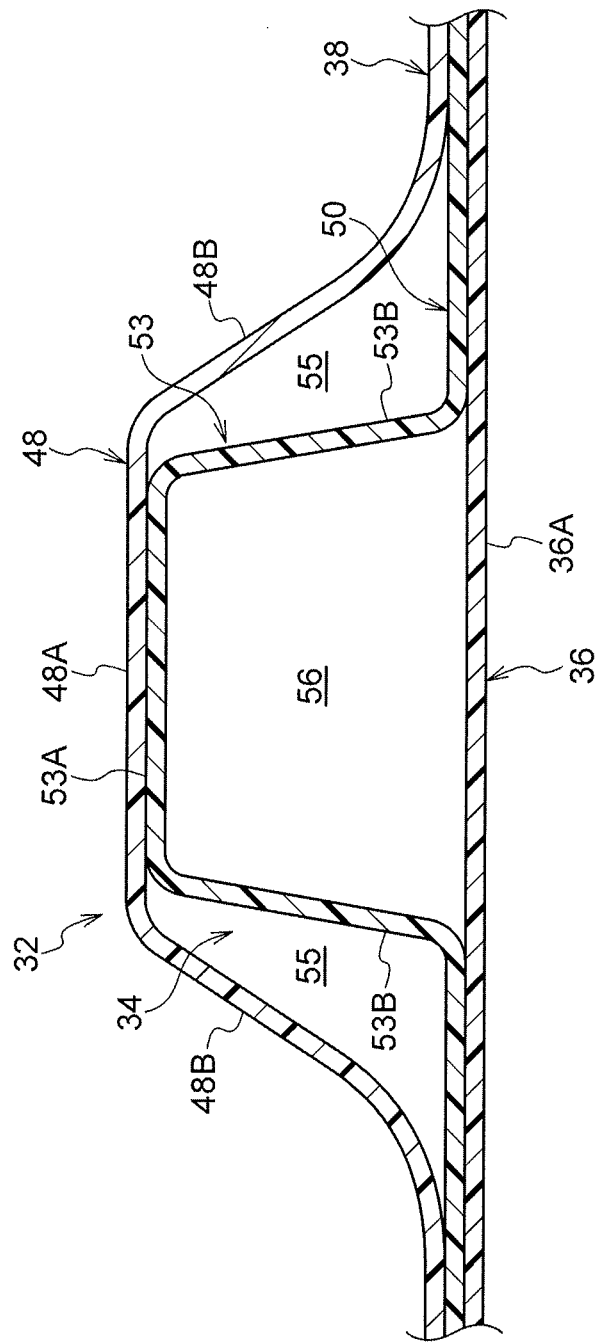
FIG. 4 is a cross-section of a protrusion bead configuring stack frame according to an exemplary embodiment, sectioned along a vehicle front-rear direction.

The two protrusion beads 53 are respectively disposed so as to enter inside the two protrusion beads 48 provided at a vehicle front-rear direction central portion of the top section 38 of the upper panel 32. As illustrated in FIG. 4, the apex faces 48A of the protrusion beads 48 and the apex portions 53A of the protrusion beads 53 are joined together by adhesive or the like.

The sloping faces 48B of the protrusion beads 48 are more gently sloping than the sloping faces 53B of the protrusion beads 53. Thus spaces 55 are formed between the sloping faces 48B of the protrusion beads 48 and the sloping faces 53B of the protrusion beads 53, configuring closed cross-sections. Moreover, the bottom face of the core body section 50 of the core panel 34 is joined by adhesive to the upper face of the bottom section 36A of the lower panel 36, and so there are spaces 56 formed between the respective protrusion beads 53 and the bottom section 36A, configuring a closed cross-section.

The resin panel unit 10 is formed as described above. Note that, although not illustrated, there are also similar spaces formed between the protrusion beads 52 and the bottom section 36A. Moreover, although, as an example in the present exemplary embodiment, there are three of the protrusion beads 52 and two of the protrusion beads 53 formed to the core body section 50, there is no limitation thereto, and there are no particular limitations to the numbers of the protrusion beads 52 and the protrusion beads 53.

Fuel Cell Stack Configuration

Next, explanation follows regarding configuration of the fuel cell stack 70 serving as a battery case supported on the stack frame 12. The fuel cell stack 70 is configured in a similar manner to an ordinary fuel cell stack, except for in the configuration of a bottom wall 72 serving as a second panel. Thus in the following explanation detailed explanation will be given regarding a configuration of the bottom wall 72 of the fuel cell stack 70, this being a characteristic part of the present invention, and illustration and explanation of other parts thereof will be omitted.

Figure 3:
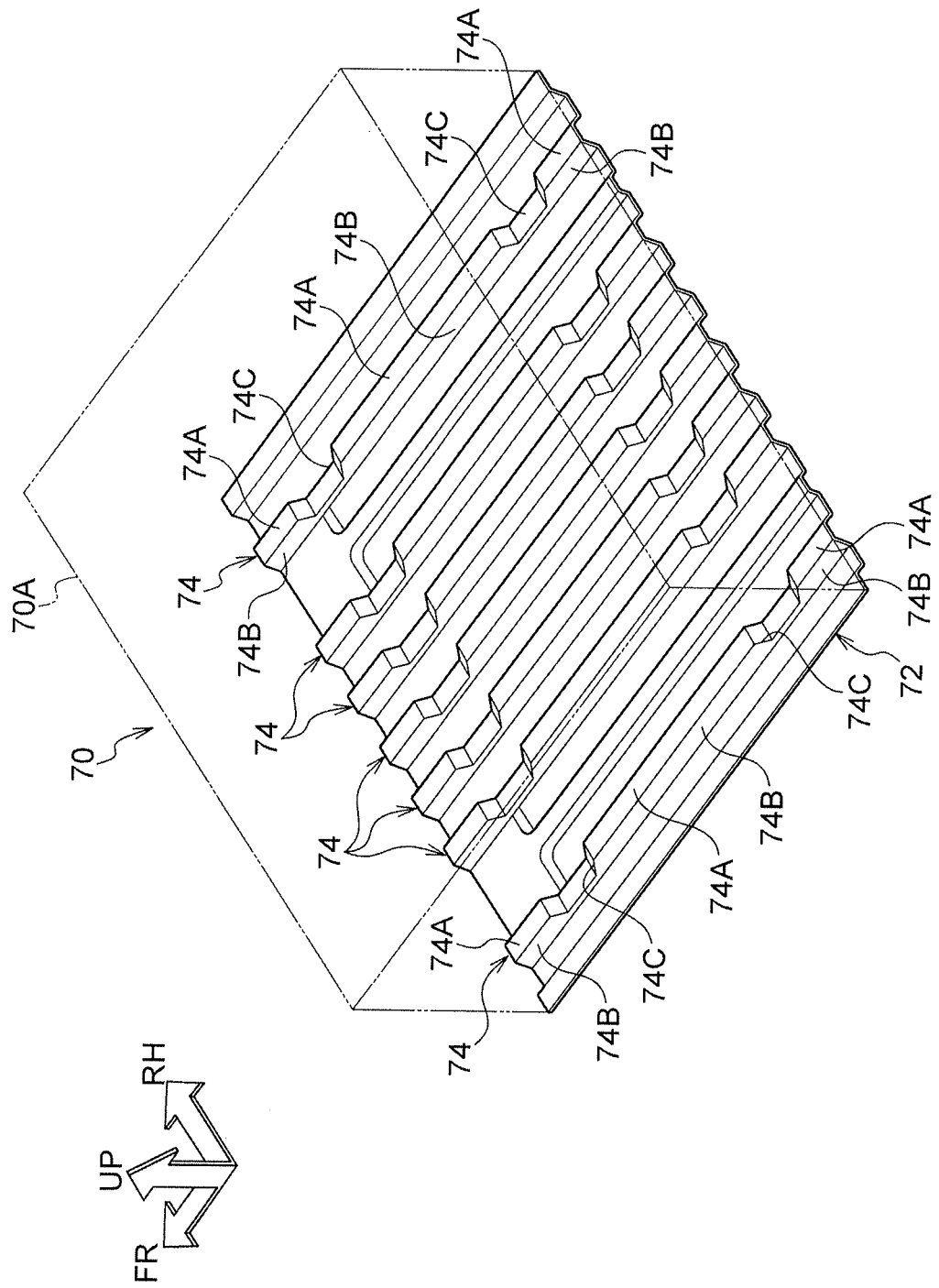
FIG. 3 is an explanatory diagram to explain a bottom wall of a fuel cell stack according to an exemplary embodiment.

As illustrated in FIG. 3, the fuel cell stack 70 that houses fuel cells is formed with an outer case 70A of rectangular box shape, with the lower face of the outer case 70A configured by the bottom wall 72 of substantially rectangular shape in plan view. The upper panel 32 and the bottom wall 72 are thereby disposed facing each other in a state in which the upper panel 32 is supporting the fuel cell stack 70.

The bottom wall 72 is formed by press forming a metal plate, and plural protrusion beads 74 are provided as second beads present extending along the vehicle front-rear direction (another direction). Namely, the protrusion beads 74 are present extending in a direction that intersects with the protrusion beads 48 provided to the upper panel 32. In the present exemplary embodiment, as an example, there are seven of the protrusion beads 74 provided in the vehicle width direction, with spacings between each other. Moreover, although the bottom wall 72 is formed from metal in the present exemplary embodiment, there is no limitation thereto, and the bottom wall 72 may be formed from resin or the like.

There are four of the protrusion beads 74 provided parallel to each other at a vehicle width direction central portion of the bottom wall 72, and there is one each of the protrusion beads 74 provided at each vehicle width direction side of, and with a spacing from, these four protrusion beads 74. Moreover, the protrusion beads 74 are formed including apex portions 74A present extending substantially horizontally along the vehicle front-rear direction, and sloping faces 74B that each slope downward from the respective apex portions 74A toward the vehicle front-rear direction. Recess portions 74C are formed where the protrusion beads 74 are indented downward at locations further to the front side than vehicle front-rear direction central portions of the protrusion beads 74, and positions further to the rear side than vehicle front-rear direction central portions of the protrusion beads 74.

The protrusion beads 74 are formed in substantially trapezoidal shapes when viewed along the vehicle width direction, and the apex portions 74A of the protrusion beads 74 are rendered discontinuous by the recess portions 74C. There are no particular limitations to the number and layout of the protrusion beads 74, and, for example, seven of the protrusion beads 74 may be provided at uniform spacings to each other.

Figure 5:
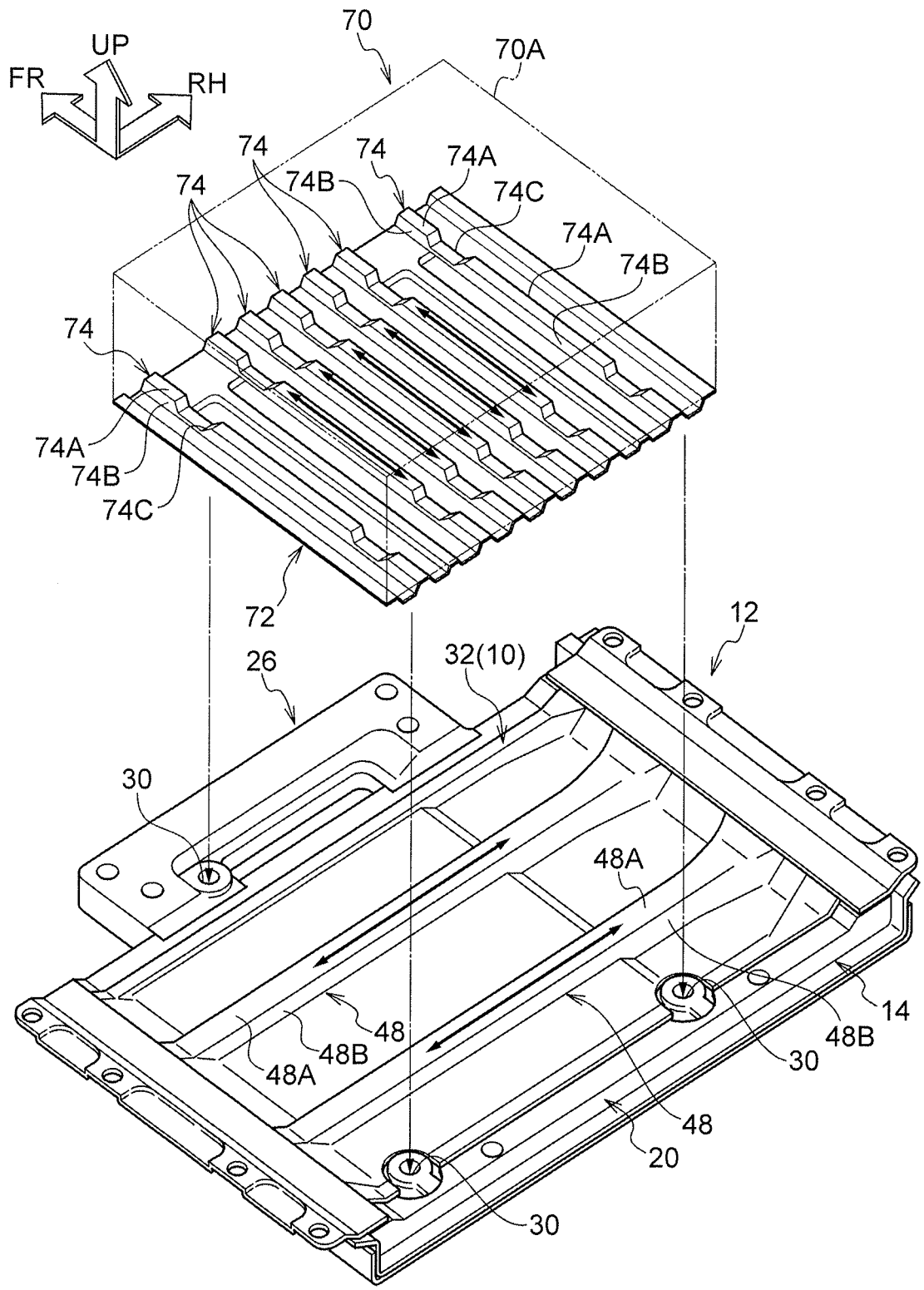
FIG. 5 is a perspective view illustrating a stack frame and a fuel cell stack configuring a vehicle panel structure according to an exemplary embodiment.

As illustrated in FIG. 5, the fuel cell stack 70 formed as described above is supported by the resin panel unit 10 attached to the stack frame 12. More precisely, bolts are inserted at three locations, the two bolt holes 30 formed in the rear side long edge section 20 configuring the frame body 14 of the stack frame 12, and the single bolt hole 30 formed in the fastening piece 26, thereby fastening the outer case 70A of the fuel cell stack 70. The bottom wall 72 of the fuel cell stack 70 is thereby disposed facing the upper panel 32 from above.

Operation and Advantageous Effects

Next, explanation follows regarding the operation and advantageous effects of the vehicle panel structure of the present exemplary embodiment. In the stack frame 12 and the fuel cell stack 70 applied with the vehicle panel structure of the present exemplary embodiment, the protrusion beads 48 of the upper panel 32 configuring the stack frame 12 and the protrusion beads 74 of the bottom wall 72 configuring the fuel cell stack 70 are present extending in directions that intersect with each other (are orthogonal to each other). Thereby, for example, load can be favorably transmitted along the protrusion beads 48 in cases in which load from the vehicle width direction acts during a vehicle side-on collision. Moreover, load can be favorably transmitted along the protrusion beads 74 of the bottom wall 72 in cases in which load from the vehicle front-rear direction acts during a vehicle frontal collision. This thereby enables the rigidity of the vehicle panel structure to be raised to load from plural directions.

In particular, in cases in which, as in the present exemplary embodiment, the fuel cell stack 70 is disposed on the lower side of a floor panel of a vehicle, and the fuel cell stack 70 is supported by the stack frame 12, limitations are placed on the thickness of the stack frame 12 in order to secure space at the vehicle interior. Moreover, the thickness of the stack frame 12 is also preferably formed thin from the perspective of avoiding impinging on projecting objects on the road surface during travelling. Moreover, the smaller the gap between the stack frame 12 and the fuel cell stack 70 the better. Thus, as in the present exemplary embodiment, respectively providing the upper panel 32 and the bottom wall 72 with the protrusion beads 48 and the protrusion beads 74 that intersect with each other enables the rigidity to be raised while suppressing any increase in thickness to the minimum due to not needing to attach separate reinforcement members or the like.

Note that although the protrusion beads 48 of the upper panel 32 and the protrusion beads 74 of the bottom wall 72 are preferably formed orthogonal to each other, the present invention is not limited thereto. The rigidity can be raised as long as the protrusion beads 48 and the protrusion beads 74 intersect with each other, even if not orthogonally.

Moreover, in the present exemplary embodiment, due to the upper panel 32, the core panel 34, and the lower panel 36 being formed from resin, a weight reduction can be achieved compared to cases in which there are from metal, while still securing the rigidity.

Moreover, in the present exemplary embodiment, the protrusion beads 48 of the upper panel 32 and the protrusion beads 52 and the protrusion beads 53 of the core panel 34 are formed so as to be present extending in the vehicle width direction. This thereby enables favorable transmission of collision load during a vehicle side-on collision along the protrusion beads 48, the protrusion beads 52, and the protrusion beads 53, enabling collision load during a side-on collision to be suppressed from acting on the fuel cell stack 70.

Moreover, providing the widening portions 48C at the vehicle width direction end portions of the protrusion beads 48 of the upper panel 32 enables the rigidity to collision load during a side-on collision to be raised even further. In a more detailed explanation regarding this point, as illustrated in FIG. 6, when a collision load is input from the vehicle right, the collision load is transmitted to the protrusion beads 48 through the widening portions 48C. Moreover, the widening portions 48C of the protrusion beads 48 disposed at the vehicle front-rear direction central portion are formed so as to widen more than the widening portions 48C of the other protrusion beads 48, such that more of the collision load is transmitted thereby. Thus by transmitting a lot of the collision load to the protrusion beads 48 having high rigidity, the effect on the upper panel 32 can be reduced.

In particular, in the present exemplary embodiment, the steps 44 are provided in the top section 38 of the upper panel 32, in a configuration in which the right top portion 38B is positioned lower, in order to discharge liquid such as water generated by the fuel cells. The rigidity further to the vehicle right than the steps 44 is accordingly lower than the rigidity further to the vehicle left than the steps 44. However, due to providing the widening portions 48C to the vehicle right end portions of the protrusion beads 48, collision load is concentrated on the protrusion beads 48, so as to enable a reduction in rigidity to be compensated for. Moreover, warping after forming can be reduced in cases, such as the present exemplary embodiment, in which the upper panel 32 is formed from a fiber reinforced resin, such as CFRP.

Moreover, as illustrated in FIG. 4, making the sloping faces 48B of the protrusion beads 48 slope more gently than the sloping faces 53B of the protrusion beads 53 enables the spaces 55 to be forming between the sloping faces 48B and the sloping faces 53B, and in combination with the spaces 56 enables a structure provided with three closed cross-sections to be achieved. Thereby, the rigidity can be raised further than in structures in which the sloping faces 48B of the protrusion beads 48 and the sloping faces 53B of the protrusion beads 53 are in close contact with each other, and warping after forming can be reduced.

Although explanation has been given above regarding a vehicle lower section structure according to an exemplary embodiment of the present invention, obviously various embodiments may be implemented within a range not departing from the spirit of the present invention. For example, the protrusion beads 48 of the upper panel 32 may be recessed beads that protrude downward. In such cases favorable joining together of the upper panel 32 and the core panel 34 can be achieved by disposing the recessed beads between the protrusion beads 52 and the protrusion beads 53 of the core panel 34.

Moreover, a sheet member substantially the same as the bottom wall 72 of the fuel cell stack 70 may be joined to the upper face of the upper panel 32. In such cases the thickness is increased by the thickness of the sheet member, however, this enables a conventional fuel cell stack (a fuel cell stack formed with a flat plate shape member on the bottom face thereof) to be employed.

The disclosure of Japanese Patent Application No. 2013-267968 filed on Dec. 25, 2013 is, by reference thereto, incorporated in the present specification in its entirety.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A vehicle panel structure comprising:
   a first panel that is provided to a vehicle, the first panel being made from a fiber reinforced resin and including a plurality of first beads extending along one direction;
   a second panel that is disposed so as to face the first panel and that includes a plurality of second beads extending along another direction intersecting with the first beads; and
   a core panel that faces the first panel and is disposed on an opposite side to the second panel, the core panel including a plurality of third beads that extend along the one direction and have the first beads superimposed thereon.

2. The vehicle panel structure of claim 1, wherein:
   each first bead has a sloping face that slopes in a vehicle front-rear direction from a top face of each first bead more gently than a sloping face of each third bead that slopes in the vehicle front-rear direction from a top face of each third bead.

3. The vehicle panel structure of claim 1, wherein the first beads extend along a vehicle width direction.

4. The vehicle panel structure of claim 3, wherein:
   at a leading end portion of each first bead in the vehicle width direction, a width of each first bead widens on progression toward the leading end.

5. A vehicle panel structure comprising:
   a battery case that is provided under a vehicle and houses a battery; and
   a stack frame that is configured including a bottom wall configuring a bottom face of the battery case and an upper panel made from fiber reinforced resin and disposed facing the bottom wall, with the stack frame supporting the battery case, wherein
   a plurality of first beads extending along one direction are provided to the upper panel,
   a plurality of second beads extending along another direction intersecting with the first beads are provided to the bottom wall,
   a core panel is provided below the upper panel, the core panel including a plurality of third beads extending along the one direction, and
   the third beads and the first beads are disposed superimposed above and below each other.

6. The vehicle panel structure of claim 5, wherein:
   each first bead has a sloping face that slopes in a vehicle front-rear direction from a top face of each first bead more gently than a sloping face of each third bead that slopes in the vehicle front-rear direction from a top face of each third bead.

\* \* \* \* \*